Aug. 15, 1933.   W. B. BOICE ET AL   1,922,151
ADJUSTING DEVICE FOR SAW ARBORS
Filed July 27, 1931   3 Sheets-Sheet 1

Inventors
William B. Boice
John E. Boice
By Owen + Owen
Attorneys

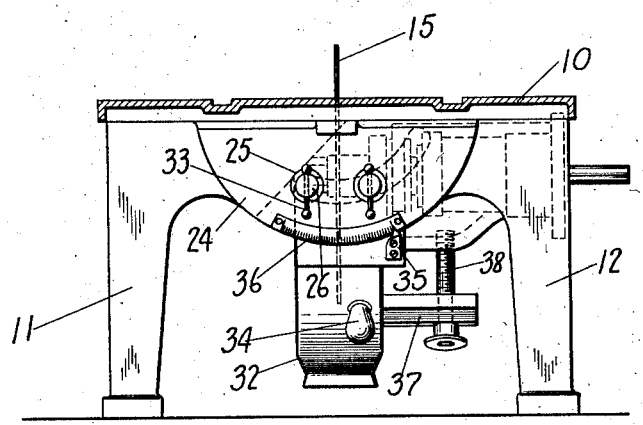
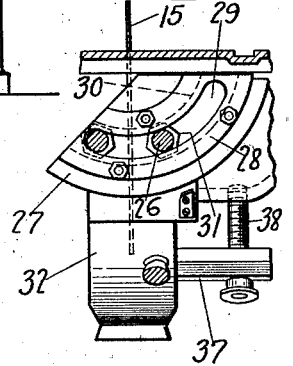
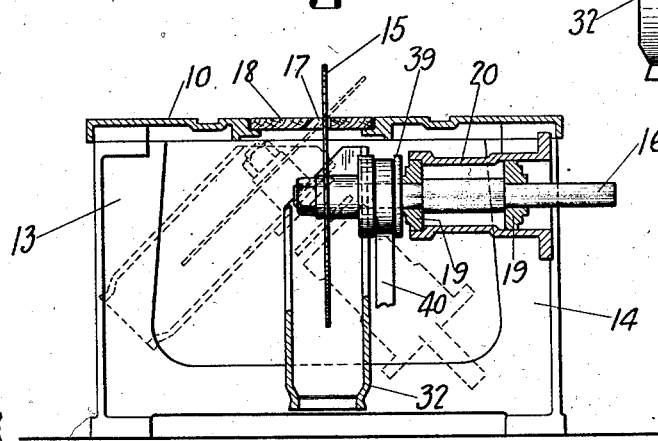
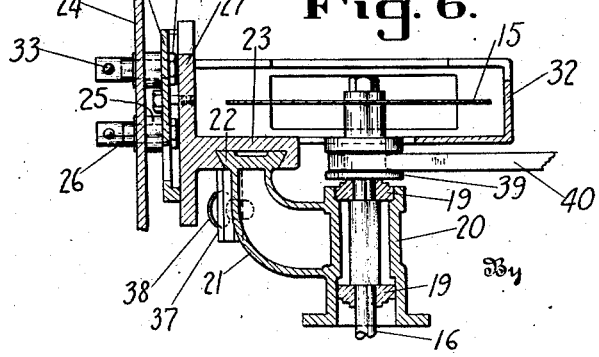

Aug. 15, 1933.  W. B. BOICE ET AL  1,922,151
ADJUSTING DEVICE FOR SAW ARBORS
Filed July 27, 1931   3 Sheets-Sheet 3

Inventors
William B. Boice
John E. Boice
By Owen & Owen
Attorneys

Patented Aug. 15, 1933

1,922,151

UNITED STATES PATENT OFFICE 1,922,151

ADJUSTING DEVICE FOR SAW ARBORS

William B. Boice and John E. Boice, Toledo, Ohio

Application July 27, 1931. Serial No. 553,236

2 Claims. (Cl. 143—35)

This invention relates to a device for adjusting the arbor of a circular saw such as is used in woodworking.

The object of the invention is to provide, in connection with the mounting for the arbor, improved means for tilting the arbor about a transverse axis which is substantially coincident with the line where the saw intersects the plane of the table, and also for raising and lowering the arbor bodily while the table remains stationary.

In the preferred form of the invention, a belt drive is used, the drive pulley being automatically shiftable lengthwise of the drive shaft in accordance with the displacement of the arbor due to the tilting adjustment thereof and the bodily raising or lowering of the arbor is in a direction tangential to an arc described about the drive pulley shaft as an axis.

The invention will be more particularly described in connection with the accompanying drawings, in which—

Figure 3 is a section taken on the line 3—3 of Fig. 1;

Figure 4 is a section taken on the line 4—4 of Fig. 1;

Figure 5 is a section taken on the line 5—5 of Fig. 1;

Figure 6 is a section taken on the line 6—6 of Fig. 1;

Figure 1:
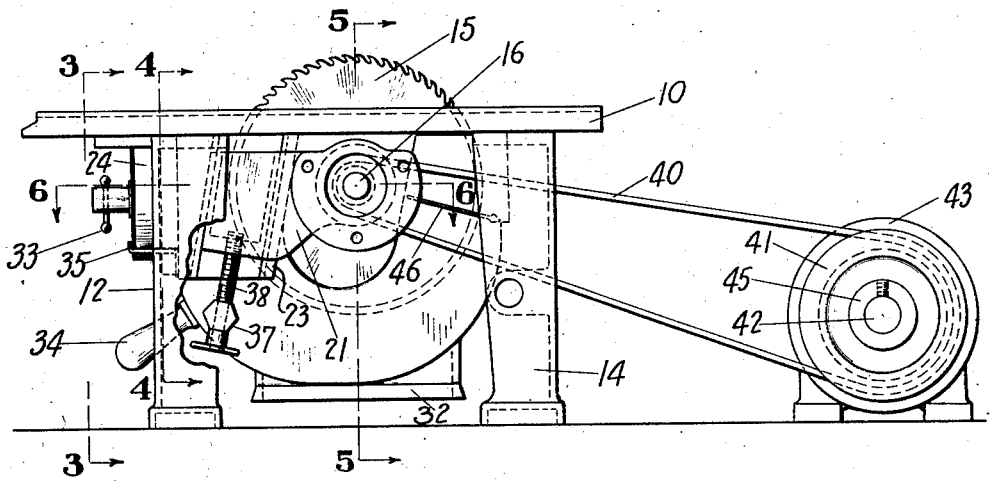
Figure 1 is a side elevation of the invention with a portion of the frame broken away.

As illustrated in the drawings, the table 10 is supported by legs 11, 12, 13 and 14. The saw 15 is carried by an arbor 16 and projects upwardly through a slot 17 in the table which is preferably provided with a removable panel 18 for convenience in mounting the saw.

The saw arbor 16 is journaled in suitable bearings 19 which are mounted in any suitable manner in a hub or other support 20. In the present embodiment of the invention, the hub 20 is formed with an arm 21 which terminates in a dovetail 22 adjustably mounted in a slideway 23.

In the preferred form of the invention, the legs 11 and 12 are integrally connected by a semicircular base 24 having bosses 25 to which the slideway 23 is secured by means of bolts 31 having sleeved nuts 26. In order to provide a tiltable mounting for the slideway 23, the latter is formed with a base 27 in the shape of a sector and an arcuate plate 28 is bolted or otherwise secured thereto. The plate 28 is formed with an arcuate slot 29 through which the bolts project and is rabbeted adjacent this slot as indicated at 30 to form an arcuate channel in which the heads of the bolts are non-rotatably held. A sawdust chute 32 is integrally or otherwise secured to the slideway 23. The nuts 26 are provided with handles 33 or other suitable means for turning the same onto the bolts 31 to clamp the base 27 in any position to which it may be adjusted. By turning the nuts 26 to loosen the bolts the base 27 may be adjusted along the slot 29 to tilt the arbor 16 and saw 15 to any desired angle. It will be noted that the axis of the slot 29 is substantially at the line where the saw intersects the surface of the table so that the tilting adjustment of the saw will not change its alinement. A suitable handle 34 is provided for effecting the adjustment of the saw to the desired angle which is indicated by a pointer 35 in connection with a scale 36 secured to the base 24.

For adjusting the saw support up or down in the slideway 23, a stud 37 is secured to the chute 32 or some other part of the casting beneath the lower end of the slideway and an adjusting screw 38 is rotatably mounted in the stud and has a threaded connection with the arm 21. Thus a rotation of the screw 38 will adjust the saw up or down.

For driving the saw a belt pulley 39 is secured to the arbor 16 and is connected by a belt 40 with a driving pulley 41 which is mounted for rotation with the shaft 42 of a motor 43. The driving pulley 41 is freely slidable lengthwise of the shaft 42 between two collars 44 and 45 secured to the shaft. The motor should be so located that the line of adjustment of the saw support in the slideway 23 is tangential to an arc described about the drive shaft 42 and an indicator 46 may be located on the saw support to denote the center line of the driving connection when the motor is properly located.

Figure 2:
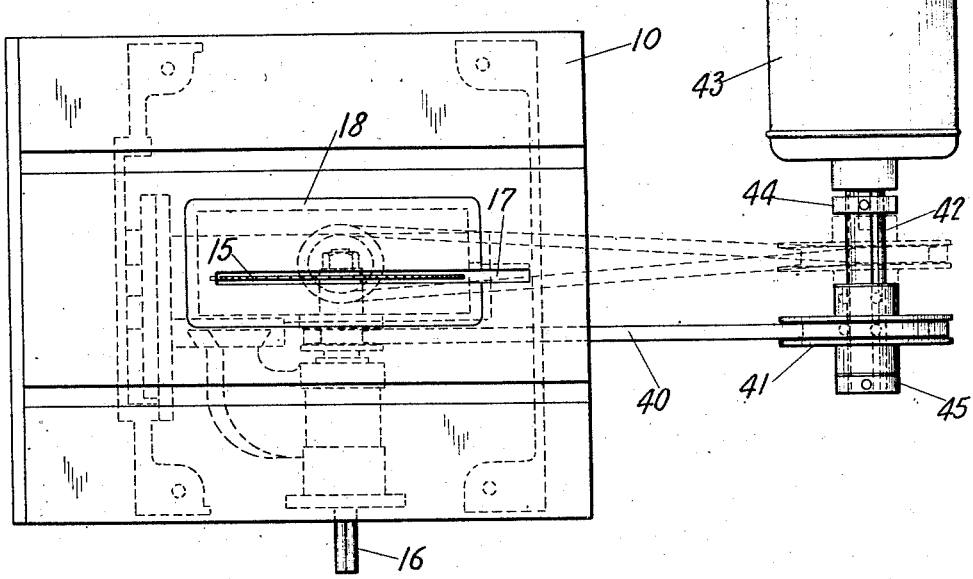
Figure 2 is a plan view of the same, showing also in dotted lines the position of the drive when the saw arbor is tilted.
Figure 7:
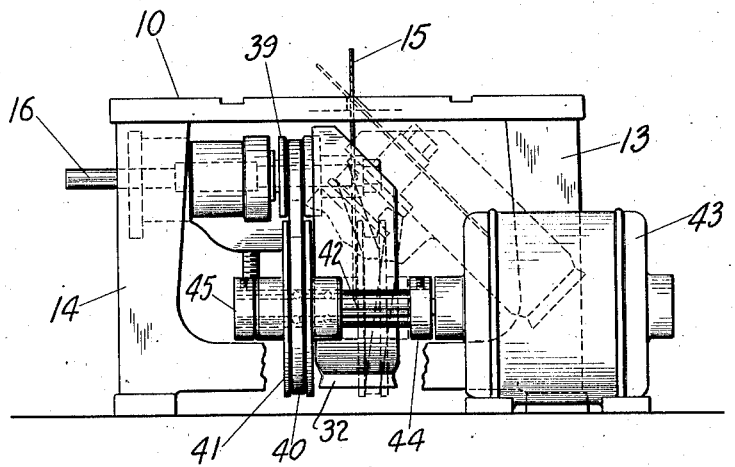
Figure 7 is a rear elevation with a portion of the frame broken away and showing also in dotted lines the position of the parts when the arbor is tilted.
Figure 8:
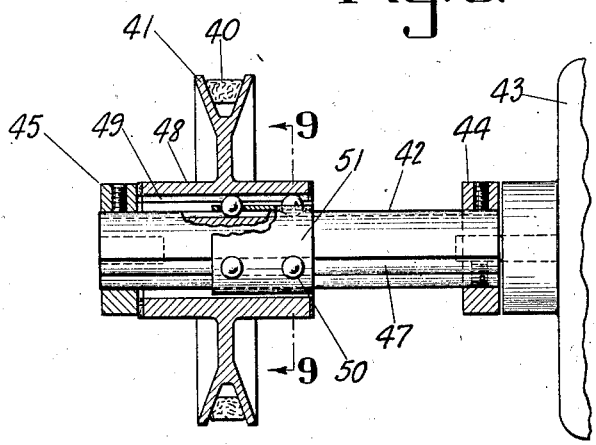
Figure 8 is a view partly in section and partly in elevation of the drive pulley and the mounting therefor.
Figure 9:
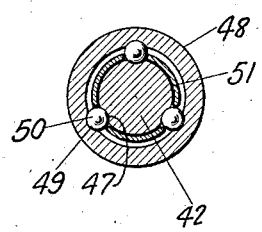
Figure 9 is a section taken on the line 9—9 of Fig. 8.

From the two positions of the saw as illustrated in Figs. 2, 5 and 7, it will be noted that the tilting adjustment shifts the position of the pulley 39 and in order to maintain the belt 40 at the same length and tension it is necessary to provide for a compensating movement of the drive pulley 41 lengthwise of the shaft 42. For this purpose the drive shaft 42 is formed with longitudinal grooves 47 and the hub 48 of the pulley 41 is formed internally with grooves 49 adapted to register with the grooves 47 and in cooperation therewith to receive ball bearings 50 which are retained in holes formed in a cylindrical cage 51 located between the hub 48 and the drive shaft. By such a construction the pulley 41 is supported for free movement longitudinally of the drive shaft and will immediately follow any tilting adjustment of the saw support to maintain the uniform driving relation between the pulleys 41 and 39. Since the bodily adjustment of the saw support in the slidway 23 is in a direction at all times substantially perpendicular to the center line of the drive, such adjustment will not result in any material change in the distance between drive shaft 42 and arbor 16.

From the foregoing description, it will be seen that we have provided a simple and practical construction whereby a belt driven woodworking saw may be raised and lowered with reference to the table and may also be tilted through any desired angle up to 45°. While we have shown and described in detail the preferred construction, it will be apparent that the same may be modified to a considerable extent without departing materially from the scope of the appended claims.

What we claim is:

1. In a woodworking machine, a table, a saw arbor, a mounting for said arbor beneath the table, a slideway in which said mounting is held, a sawdust chute rigidly connected to said slideway, a stud projecting from the chute underneath the slideway, a screw swiveled in the stud and having a threaded connection with said mounting for adjusting the arbor up and down, a support for said slideway, and means for adjusting said support angularly about an axis which is substantially coincident with the line of cut.

2. In a woodworking machine, a table, a saw arbor, a mounting for said arbor beneath the table, a slideway in which said mounting and arbor are bodily adjustable up and down, a base for said slideway secured beneath the surface of the table and having a vertical face with bosses projecting therefrom, said slideway having a vertically disposed base plate with an arcuate slot therein, and bolts extending through said slot for clamping said base plate to said base, whereby the slideway and arbor mounting may be tiltably adjusted about the center of said arc whenever the bolts are loosened.

WILLIAM B. BOICE.
JOHN E. BOICE.